(12) United States Patent
Mookerjee et al.

(10) Patent No.: US 7,375,679 B1
(45) Date of Patent: May 20, 2008

(54) REDUCED STATE ESTIMATION WITH BIASED AND OUT-OF-SEQUENCE MEASUREMENTS FROM MULTIPLE SENSORS

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/204,630

(22) Filed: Aug. 16, 2005

(51) Int. Cl.
*G01S 7/285* (2006.01)
(52) U.S. Cl. .................. 342/195; 342/90; 342/162
(58) Field of Classification Search ........... 342/195, 342/192, 90, 95–97, 160–162
See application file for complete search history.

(56) References Cited

U.S. PATENT DOCUMENTS

| | | | |
|---|---|---|---|
| 5,432,816 A * | 7/1995 | Gozzo ........................ | 375/232 |
| 5,825,326 A * | 10/1998 | Semler et al. ......... | 342/357.04 |
| 6,285,971 B1 * | 9/2001 | Shah et al. .................... | 703/2 |
| 7,009,554 B1 * | 3/2006 | Mookerjee et al. ......... | 342/195 |
| 7,180,443 B1 * | 2/2007 | Mookerjee et al. ......... | 342/195 |
| 2005/0128138 A1 * | 6/2005 | McCabe et al. ............ | 342/195 |
| 2005/0179580 A1 * | 8/2005 | Cong et al. ................. | 342/70 |

FOREIGN PATENT DOCUMENTS

| | | | |
|---|---|---|---|
| JP | 62027679 A | * | 2/1987 |
| JP | 03183982 A | * | 8/1991 |
| JP | 03245080 A | * | 10/1991 |
| JP | 05150038 A | * | 6/1993 |

OTHER PUBLICATIONS

Y. Bar-Shalom and T.E. Fortmann, Tracking and Data Association, San Diego, CA: Academic Press, Inc., 1988.
Y. Bar-Shalom, X.R. Li, and T. Kirubarajan, Estimation with Applications to Tracking and Navigation: Theory, Algorithms, and Software. New York, NY: Wiley, 2001.
B. Friedland, "Treatment of Bias in Recursive Filtering," IEEE Transactions on Automatic Control, pp. 359-367, vol. AC-14, No. 4, Aug. 1969.

(Continued)

*Primary Examiner*—John B. Sotomayor
(74) *Attorney, Agent, or Firm*—Duane Morris, LLP

(57) ABSTRACT

This invention relates to state estimation after processing time-delayed measurements with unknown biases that may vary arbitrarily in time within known physical bounds. These biased measurements are obtained from systems characterized by state variables and by multidimensional parameters, for which the latter are also unknown and may vary arbitrarily in time within known physical bounds. If a measurement is time-late, apply the measurements to an out-of-sequence filter using a mean square optimization criterion that accounts for all sources of uncertainty and delay time, to produce estimates of the true states of the system. If the measurement is not time-late, apply the measurements to an in-sequence filter using a mean square optimization criterion that accounts for all sources of uncertainty to produce estimates of the true states of the system. The estimates are applied to one of (a) making a decision, (b) operating a control system, and (c) controlling a process.

6 Claims, 3 Drawing Sheets

OTHER PUBLICATIONS

D. Haessig and B. Friedland, "Separate-Bias Estimation with Reduced-Order Kalman Filters," IEEE Transactions on Automatic Control, pp. 983-987, vol. 43, No. 7, Jul. 1998.

X.R. Li and V.P. Jilkov, "A Survey of Maneuvering Target Tracking—Part IV: Decision-Based Methods," Proceedings of SPIE vol. 4728 (2002), pp. 511-534.

P. Mookerjee and F. Reifler, "Optimal Reduced State Estimators for Consistent Tracking of Maneuvering Targets with Single and Multiple Sensors," (Submitted to IEEE Transactions on Aerospace and Electronic Systems).

G.J. Portman, J.R. Moore, and W.G. Bath, "Separated Covariance Filtering," Record of the IEEE 1990 International Radar Conference, 1990, pp. 456-460.

Y. Bar-Shalom and X.R. Li, *Multitarget-Multisensor Tracking: Principles and Techniques*, p. 26 Storrs, CT: YBS Publishing, 1995.

P. Mookerjee and F. Reifler, "A Reduced State Estimator for Systems with Parametric Inputs," to appear (in press) in *IEEE Transactions on Aerospace and Electronic System*.

Y. Bar-Shalom, M. Mallick, H. Chen, and R. Washburn, "One-Step Solution for the General Out-of-Sequence-Measurement Problem in Tracking," *Proceedings of 2002 IEEE Aerospace Conference Proceedings*, vol. 4, pp. 1551-1559, 2002.

W.D. Blair and Y. Bar-Shalom, "Tracking Maneuvering Targets with Multiple Sensors: Does More Data Always Mean Better Estimates?" *IEEE Transactions on Aerospace and Electronic Systems*, pp. 450-456, vol. AES-32, No. 1, Jan. 1996.

K. Malakian and A. Vidmar, "New Track-to-track Association Logic for Almost Identical Multiple Sensors," 3rd *National Symposium on Sensor Fusion*, Orlando, FL, Apr. 16-20, 1990, pp. 315-328.

P. Mookerjee and F. Reifler, "Application of Reduced State Estimation to Multisensor Fusion with Out-of-Sequence Measurements," to appear (in press) in 2004 *IEEE Radar Conference*, Philadelphia, PA. (To appear in the conference proceedings and accepted for oral presentation in Arp. 2004).

J.R. Moore and W.D. Blair, "Practical Aspects of Multisensor Tracking," in *Multitarget-Multisensor Tracking: Applications and Advances*, vol. III, Y. Bar-Shalom and William Dale Blair, (ed.), Artech House, 2000, pp. 43-44.

\* cited by examiner

REDUCED STATE ESTIMATION WITH BIASED AND OUT-OF-SEQUENCE MEASUREMENTS FROM MULTIPLE SENSORS

CROSS-REFERENCE TO RELATED APPLICATIONS

This patent application is related to copending applications "Reduced State Estimator for Systems with Physically Bounded Parameters" filed on Mar. 16, 2005 in the names of P. Mookerjee and F. Reifler, "REDUCED STATE ESTIMATION WITH MULTISENSOR FUSION AND OUT-OF-SEQUENCE MEASUREMENTS", filed on Mar. 30, 2005, in the names of P. Mookerjee and F. Reifler, and "REDUCED STATE ESTIMATION WITH BIASED MEASUREMENTS", filed on Apr. 22, 2005, in the names of P. Mookerjee and F. Reifler.

FIELD OF THE INVENTION

This invention relates generally to state estimation after processing measurements having unknown biases that may vary arbitrarily in time within known physical bounds and arriving with time delays from multiple sensors. These measurements are obtained from systems characterized by state variables and by multidimensional parameters, for which the latter are also unknown and may vary arbitrarily in time within known physical bounds. In a particular aspect, the invention relates to the tracking of moving targets by multiple sensors, with different measurement bias for each sensor and feeding these measurements into a central processing site, possibly with different time delays. The invention provides a computationally efficient recursive algorithm for optimally estimating the state of a system, using the criterion of minimizing the mean-square total error.

BACKGROUND OF THE INVENTION

FIG. 1 represents a simplified target tracking system 10. System 10 tracks a target, illustrated as being an aircraft 12, by the use of multiple radar systems 14, 16. Radar system 14 includes a radar antenna 14a, which transmits and receives radar signals illustrated by "lightning bolt" symbols 18. Portions of the transmitted signals 18 are reflected by target 12 and return to the radar antenna 14a. The returned signals allow the generation of measurements at an output port 14o of radar system 14. Radar system 16 includes a radar antenna 16a, which transmits and receives radar signals illustrated by "lightning bolt" symbols 20. Portions of the transmitted signals 20 are reflected by target 12 and return to the radar antenna 16a. The returned signals allow the generation of measurements at an output port 16o of radar system 16. These measurements include values of at least target position, possibly in the form of range and angles from the radar systems 14 and 16. A possible scenario is that radar systems 14 and 16 have measurements which are corrupted by unknown random measurement noises, characterized by a covariance and unknown time-varying biases with known bounds. The biases may be, for example, the result of sensor misalignment. Furthermore, radar system 16 provides data with time latency, but which are more accurate (less measurement noise) than those provided by radar system 14. The measurements are applied to a processing arrangement 22, which determines from the measurements various target parameters, which may include course (direction of motion), speed, and target type. The estimated position of the target, and possibly other information, is provided to a utilization apparatus or user, illustrated in this case as being a radar display 24. The operator (or possibly automated decision-making equipment) can make decisions as to actions to be taken in response to the displayed information. It should be understood that the radar tracking system 10 of FIG. 1 is only one embodiment of a general class of estimation systems for systems with distributed sensors such as nuclear, chemical, or manufacturing factories or facilities, control processes subject to external parameter changes, space station subject to vibrations, automobile subject to weather conditions, and the like.

State-of-the-art tracking systems utilize measurements fed with time delays from multiple sensors to a processing site. These sensors may have different measuring accuracies (i.e., random errors) and unknown measurement biases that may be time-varying within physical bounds. Furthermore, these sensors may be geographically dispersed over a region of interest. Availability of reliable high bandwidth communication media allows such a topology of distributed multiple sensors for real-time processing of the measurements. Therefore, latent measurements from a remote sensor could arrive after state estimation at the current time is complete.

In spite of today's high bandwidth and fast switching communication network, physical distances, path diversity and relays may result in different delays from various sensors to the processing site. Let a sensor $S_1$ measure a tracked object at time $t_1$ and a sensor $S_2$ measure that same object at time $t_2$ where $t_2 > t_1$. It is possible that the measurement from sensor $S_1$ may arrive many sampling intervals after the measurement from sensor $S_2$ has already been processed. A simple decision methodology is to throw out the late-arriving measurement from sensor $S_1$, and not process it at all. However, if sensor $S_1$ is the more accurate sensor, this methodology does not make good use of the available sensor resources.

A difficulty is that accounting for measurements received out of sequence, as frequently happens in situations of multiple sensor tracking with variable communication delays between sensors, greatly complicates the design of a Kalman filter, particularly when more than one subsequent measurement is processed before an out-of-sequence measurement is received. A solution to this problem is discussed in a pending patent application entitled "REDUCED STATE ESTIMATION WITH MULTISENSOR FUSION AND OUT-OF-SEQUENCE MEASUREMENTS", filed on Mar. 30, 2005, in the names of P. Mookerjee and F. Reifler.

Consider the problem of tracking an airplane whose trajectory in three dimensions is an arbitrary curve with bounded instantaneous turn rate and tangential acceleration. The parameters of this tracking problem are the turn rate ω (which can be related to the curvature of the trajectory) and the tangential acceleration α. Sensors, such as multiple radars, observe the position of this airplane. Each sensor is subject to alignment errors which cause it to be rotated by an unknown amount from its nominal alignment, possibly as a consequence of imperfect mechanical mounting, flexure of the array structure due to temperature effects etc. These small or infinitesimal rotations constitute a vector b. The parameters, ω, α, and b are neither exclusively constant nor strictly white noise stochastic processes, but vary arbitrarily in time within physical bounds.

This problem belongs to a more general problem of estimating the state of a system using biased measurements. A solution to this problem is discussed in a pending patent application entitled "REDUCED STATE ESTIMATION WITH BIASED MEASUREMENTS", filed on Apr. 22, 2005, in the names of P. Mookerjee and F. Reifler.

The method of the prior art is to estimate the states of a system when measurements are either out-of-sequence or biased. Improved or alternative estimators are desired for coping with biased measurements which are also delayed.

SUMMARY OF THE INVENTION

A method according to the invention is for recursively estimating the state of a system having multidimensional parameters $\lambda$ in addition to state variables $x(k)$ at time $t_k$ for $k=0, 1, 2, \ldots$, where the parameters $\lambda$ are unknown, arbitrarily time-varying, but bounded, and driven by the input function $u(x(k), \lambda)$, which may be nonlinear, and expressed by the state equation $$x(k+1) = \Phi x(k) + \Gamma u(x(k), \lambda) \quad (1)$$

where $\Phi$, $\Gamma$ are system matrices dependent on the discrete time interval $T = t_{k+1} - t_k$. The method comprises the steps of:

(a) Measuring aspects of the state of the system to produce initial measurements expressed by the measurement equation $$z(k) = Hx(k) + Jb + n(k) \quad (2)$$

for $1 \leq k \leq k_0$, where, if no measurements are used in the initialization of the filter, $k_0 = 0$. Variable b is an unknown, arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$;

(b) Initializing state estimates $\hat{x}(k_0|k_0)$ and matrices $M(k_0|k_0)$, $D(k_0|k_0)$, $E(k_0|k_0)$ associated with the initial state covariance and using a priori information and the initial measurements ($D(k_0|k_0) = 0$ if the initial state estimates do not depend on the parameters $\lambda$; $E(k_0|k_0) = 0$ if there are no initial measurements). In general, vector $\hat{x}(t|k)$ is defined as the estimate of the state of the system at time t after processing k measurements $z(i)$ for $1 \leq i \leq k$;

vector $\hat{x}(t_j|k)$ is denoted as $\hat{x}(j|k)$ when the time $t = t_j$ is the time of the $j^{th}$ measurement for $j = 1, 2, 3, \ldots$;

matrix $M(t|k)$ is defined as the covariance of the state estimation errors at time t due only to the random errors in the k measurements $z(i)$ for $1 \leq i \leq k$ and a priori initial information that is independent of the parameter uncertainty and the measurement bias uncertainty. The matrix $M(t_j|k)$ is denoted as $M(j|k)$, when the time $t = t_j$ is the time of the $j^{th}$ measurement for $j = 1, 2, 3, \ldots$;

matrix $D(t|k)$ is defined as the matrix of bias coefficients, which linearly relates state estimation errors to the parameter errors, at time t (after processing k measurements $z(i)$ for $1 \leq i \leq k$);

matrix $D(t_j|k)$ is denoted as $D(j|k)$, when the time $t = t_j$ is the time of the $j^{th}$ measurement for $j = 1, 2, 3, \ldots$;

matrix $E(t|k)$ is defined as the matrix of bias coefficients, which linearly relates state estimation errors to the sensors measurement bias, at time t (after processing k measurements $z(i)$ for $1 \leq i \leq k$);

matrix $E(t_j|k)$ is denoted as $E(j|k)$, when the time $t = t_j$ is the time of the $j^{th}$ measurement for $j = 1, 2, 3, \ldots$.

(c) The time $t_{k+1}$ of a new measurement and the time t when the filter was last updated are determined.

(d) The system transition matrices $\Phi$ and $\Gamma$ are determined using the update interval $T = t_{k+1} - t$. Note that for the update interval $T = t_{k+1} - t$, the time t denotes the time when the filter was last updated, whereas $t_{k+1}$ is the time of the new measurement, which can be prior to t due to delay. For this case $T < 0$. If there is no delay, then usually $t = t_k$, the time of the previous measurement. For this case $T \geq 0$.

(e) The mean value $\bar{\lambda}$ of unknown but bounded parameters $\lambda$, and the input vector $u(\hat{x}(t|k), \bar{\lambda})$ are determined.

(f) Aspects of the state of the system are measured and expressed by the measurement equation $$z(k) = Hx(k) + Jb + n(k) \quad (3)$$

where b is an unknown arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$ for $k = 1, 2, 3, \ldots$.

(g) A determination is made as to whether the measurement is time-late by testing $T < 0$, If the measurement is time-late then 1. Matrices F, G are determined by $$F = \Phi + \Gamma \frac{\partial u}{\partial x}\bigg|_{x=\hat{x}(t|k), \lambda=\bar{\lambda}} \quad (4)$$

$$G = \Gamma \frac{\partial u}{\partial \lambda}\bigg|_{x=\hat{x}(t|k), \lambda=\bar{\lambda}}. \quad (5)$$

2. A parameter matrix $\Lambda$ is generated, representing physical bounds on those parameters $\lambda$ that are not state variables of the system.

3. The state estimates $\hat{x}(t|k)$ and matrices $M(t|k)$, $D(t|k)$, $E(t|k)$ are extrapolated to $\hat{x}(k+1|k)$, $M(k+1|k)$, $D(k+1|k)$, $E(k+1|k)$ as in $$\hat{x}(k+1|k) = \Phi \hat{x}(t|k) + \Gamma u(\hat{x}(t|k), \bar{\lambda}) \quad (6)$$

$$M(k+1|k) = FM(t|k)F' \quad (7)$$

$$D(k+1|k) = FD(t|k) + G \quad (8)$$

$$E(k+1|k) = FE(t|k) \quad (9)$$

and $P(k+1|k)$ is calculated, as in $$P(k+1|k) = M(k+1|k) + D(k+1|k)\Lambda D(k+1|k) \quad (10)$$

4. The covariance of the residual Q is determined, as in $$V = HE(k+1|k) + J \quad (11)$$

$$Q = HP(k+1|k)H' + VBV' + N \quad (12)$$

5. The filter gain matrix K is determined, as in $$A = M(t|k)F'H' + D(t|k)\Lambda D(k+1|k)'H' + E(t|k)BV' \quad (13)$$

$$K = AQ^{-1} \quad (14)$$

6. The matrix L is determined, as in $$L = I - KHF \quad (15)$$

where I is the identity matrix

7. The state estimate $\hat{x}(t|k)$ is updated as $$\hat{x}(t|k+1) = \hat{x}(t|k) + K[z(k+1) - H\hat{x}(k+1|k)] \quad (16)$$

8. The matrices $M(t|k)$, $D(t|k)$, $E(t|k)$ are updated to yield $M(t|k+1)$, $D(t|k+1)$, and $E(t|k+1)$, as in $$M(t|k+1) = LM(t|k)L' + KNK' \quad (17)$$

$$D(t|k+1) = D(t|k) - KHD(k+1|k) \quad (18)$$

$$E(t|k+1) = E(t|k) - KV \quad (19)$$

respectively, and

9. The total mean square error $S(t|k+1)$ is generated, as in $$S(t|k+1)=M(t|k+1)+D(t|k+1)\Lambda D(t|k+1)'+E(t|k+1)BE(t|k+1)' \quad (20)$$

(h) Determining whether the measurement is time-late by testing if T<0. If the measurement is not time-late then
1. Matrices F,G are determined using $$F = \Phi + \Gamma \frac{\partial u}{\partial x}\bigg|_{x=\hat{x}(k|k), \lambda=\bar{\lambda}} \quad (21)$$

$$G = \Gamma \frac{\partial u}{\partial \lambda}\bigg|_{x=\hat{x}(k|k), \lambda=\bar{\lambda}} \quad (22)$$

2. A parameter matrix $\Lambda$ is generated, representing physical bounds on those parameters $\lambda$ that are not state variables of the system;
3. The state estimates $\hat{x}(k|k)$ and matrices $M(k|k)$, $D(k|k)$, $E(k|k)$ are extrapolated to yield $\hat{x}(k+1|k)$, $M(k+1|k)$, $D(k+1|k)$, $E(k+1|k)$ as $$\hat{x}(k+1|k)=\Phi\hat{x}(k|k)+\Gamma u(\hat{x}(k|k),\bar{\lambda}) \quad (23)$$

$$M(k+1|k)=FM(k|k)F' \quad (24)$$

$$D(k+1|k)=FD(k|k)+G \quad (25)$$

$$E(k+1|k)=FE(k|k) \quad (26)$$

4. Filter matrix $P(k+1|k)$, intermediate matrix $V$, and covariance of the residual $Q$ are determined as $$P(k+1|k)=M(k+1|k)+D(k+1|k)\Lambda D(k+1|k)' \quad (27)$$

$$V=HE(k+1|k)+J \quad (28)$$

$$Q=HP(k+1|k)H'+VBV'+N \quad (29)$$

5. The filter gain matrix $K$ is determined as $$A=P(k+1|k)H'+E(k+1|k)BV' \quad (30)$$

$$K=AQ^{-1} \quad (31)$$

6. The matrix $L$ is determined as $$L=I-KH \quad (32)$$

where $I$ is the identity matrix
7. The state estimate $\hat{x}(k+1|k)$ is updated as $$\hat{x}(k+1|k+1)=\hat{x}(k+1|k)+K[z(k+1)-H\hat{x}(k+1|k)] \quad (33)$$

8. The matrices $M(k+1|k)$, $D(k+1|k)$, and $E(k+1|k)$ are updated as $$M(k+1|k+1)=LM(k+1|k)L'+KNK' \quad (34)$$

$$D(k+1|k+1)=LD(k+1|k) \quad (35)$$

$$E(k+1|k+1)=LE(k+1|k)-KJ \quad (36)$$

and
9. The total mean square error $S(k+1|k+1)$ is generated as follows $$S(k+1|k+1)=M(k+1|k+1)+D(k+1|k+1)\Lambda D(k+1|k+1)'+E(k+1|k+1)BE(k+1|k+1)' \quad (37)$$

According to another aspect of the invention, a method comprises the steps of:
(i) Observing a system having state variables and also having unknown, multidimensional, arbitrarily time-varying parameters, but which are subject to known bounded values;
(ii) Measuring certain aspects of the state of the system in the presence of sensor measurement biases and random errors to produce initial measurements;
(iii) Initializing state estimates and matrices using a priori information and the initial measurements;
(iv) Using the update interval in determining the system transition matrices and the mean value of unknown but bounded parameters and the input vector;
(v) Determining if the measurement is time-late by testing the sign of the update interval;
(vi) If the measurement is time-late, applying the measurements to an out-of-sequence estimating filter that explicitly uses a mean square optimization criterion that separately accounts for measurement biases and errors and the bounding values, as well as the delay time, to produce estimates of the true state of the system;
(vii) If the measurement is not time-late, applying the measurements to an in-sequence estimating filter that explicitly uses a mean square optimization criterion that separately accounts for measurement biases and errors and the bounding values, to produce estimates of the true state of the system;
(viii) Applying the estimates to one of (a) make a decision, (b) operate a control system, and (c) control a process.

DESCRIPTION OF THE INVENTION

Figure 1:
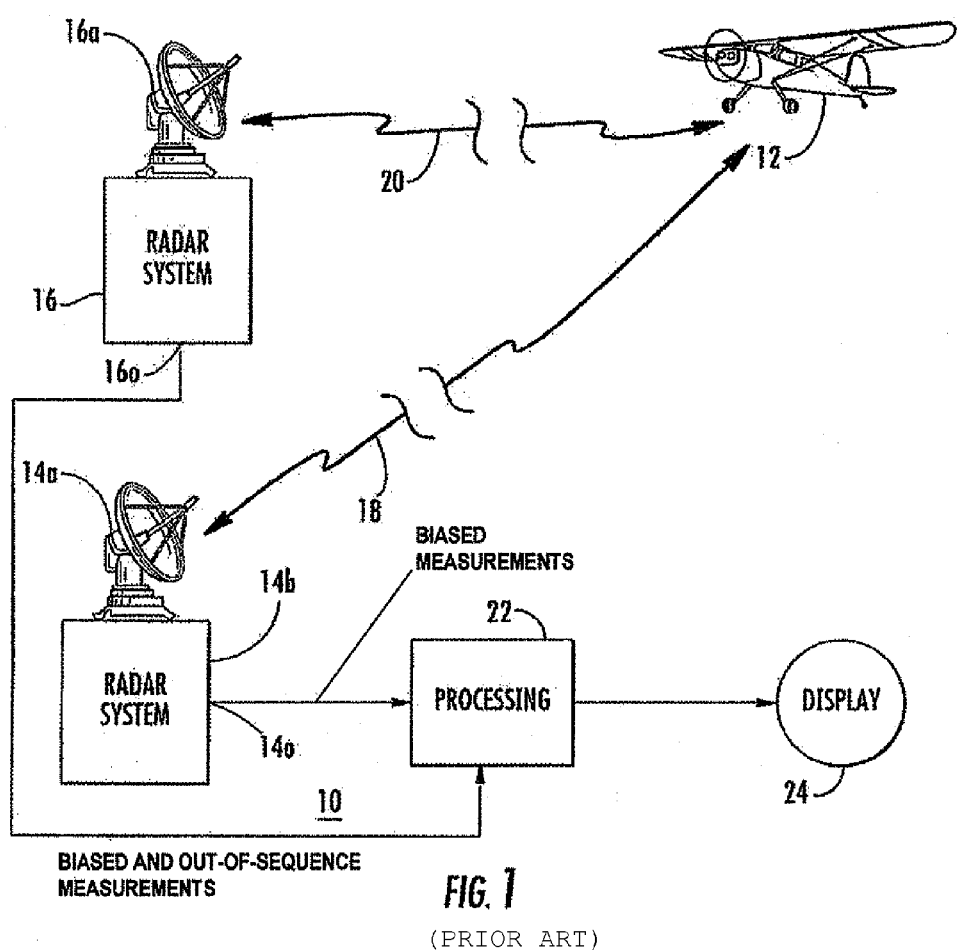
FIG. 1 is a simplified block diagram of a system for estimating the state of a target, which in this case is the track of an aircraft performing bounded maneuvers, after processing measurements with biases and random errors from multiple sensors.
Figure 2:
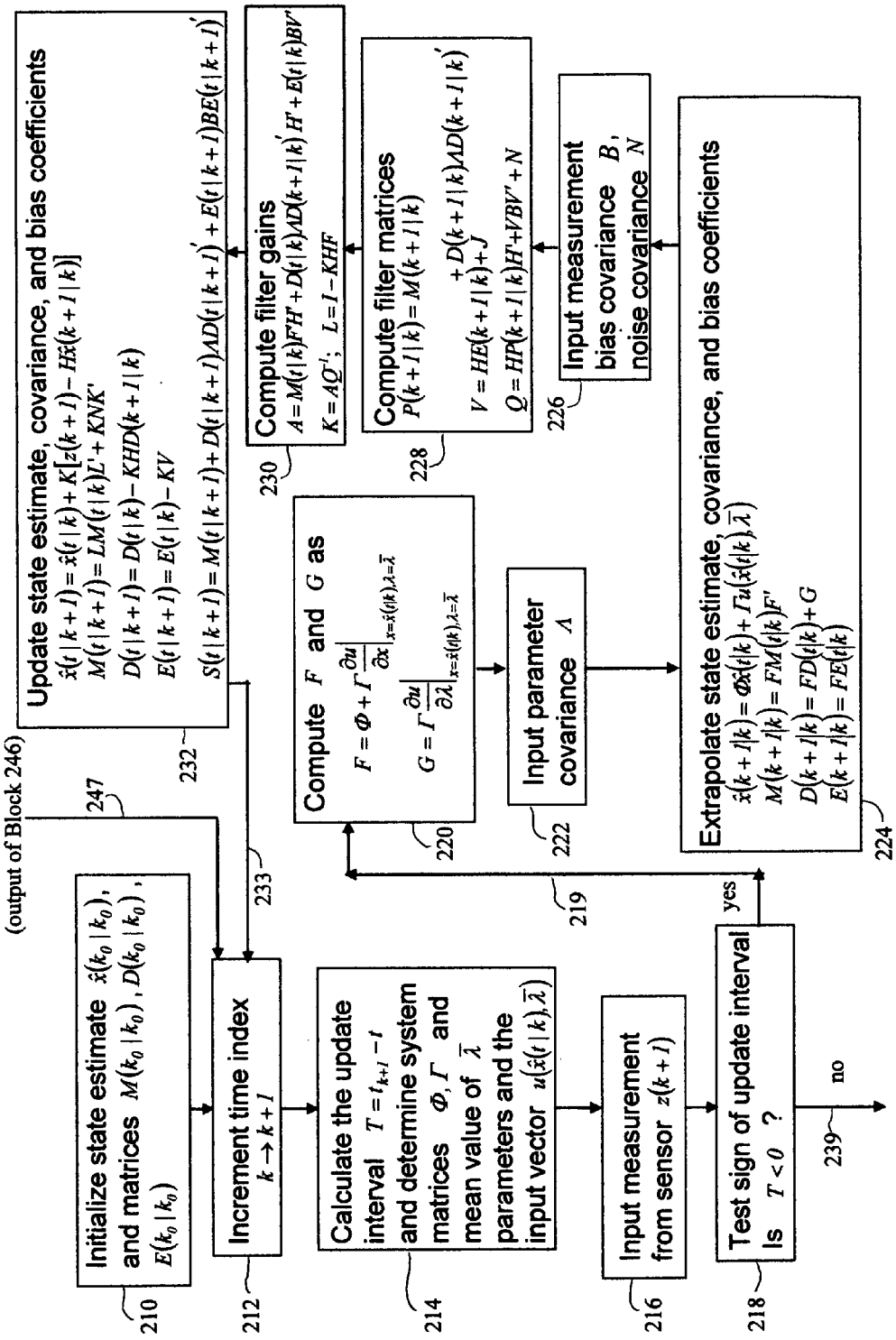
FIGS. 2 and 3 together constitute a simplified logic flow chart or diagram illustrating the recursive processing associated with a reduced-state estimator according to an aspect of the invention, which may be used in the arrangement of FIG. 1.

State estimation after processing multisensor measurements with time delays and with unknown biases that may vary arbitrarily in time within known physical bounds is considered. These measurements are obtained from systems characterized by state variables and by multidimensional parameters, for which the latter are unknown and may vary arbitrarily in time within known physical bounds. The solution of the problem requires a completely different method from the prior art. The simplified logic flow chart or diagram 200 of FIG. 2 illustrates a method according to an aspect of the invention. In FIG. 2, the logic flow of the invention begins in a block 210 with initialization of the state estimate $\hat{x}(k_0|k_0)$ and the matrices $M(k_0|k_0)$, $D(k_0|k_0)$, $E(k_0|k_0)$. In general, a vector $\hat{x}(t|k)$ is defined as the estimate of the state of the system at time $t$ after processing $k$ measurements $z(i)$ for $1 \leq i \leq k$. The vector $\hat{x}(t_j|k)$ is denoted as $\hat{x}(j|k)$ when the time $t=t_j$ is the time of the $j^{th}$ measurement for $j=1, 2, 3, \ldots$ . matrix $M(t|k)$ is defined as the covariance of the state estimation errors at time $t$ due only to the errors in the measurements $z(i)$ for $1 \leq i \leq k$ and a priori initial information that is independent of the parameter uncertainty and measurement bias uncertainty. The matrix $M(t_j|k)$ is denoted as $M(j|k)$, when the time $t=t_j$ is the time of the $j^{th}$ measurement for $j=1, 2, 3, \ldots$ . A matrix $D(t|k)$ is defined as the matrix of bias coefficients, which linearly relates state estimation errors to the parameter errors, at time $t$ (after processing k=0, 1, 2, . . . measurements). The matrix D(t$_j$|k) is denoted as D(j|k), when the time t=t$_j$ is the time of the j$^{th}$ measurement for j=1, 2, 3, . . . . A matrix E(t|k) is defined as the matrix of bias coefficients, which linearly relates state estimation errors to the sensor measurement bias, at time t (after processing k=0, 1, 2, . . . measurements). The matrix E(t$_j$|k) is denoted as E(j|k), when the time t=t$_j$ is the time of the j$^{th}$ measurement for j=1, 2, 3, . . . . The use of the matrices M(j|k), D(j|k), and E(j|k) instead of S(j|k) is a difference of the current invention from the prior art. From block 210, the logic of the invention of FIG. 2 flows to a block 212, which represents the incrementing of a time index k to k+1.

The logic of FIG. 2 then flows to a further block 214, which represents calculating the update interval according to $$T=t_{k+1}-t \quad (38)$$

and determining the system transition matrices Φ, Γ, and the mean value $\bar{\lambda}$ of unknown but bounded parameters λ and also the input vector u($\hat{x}$(t|k),$\bar{\lambda}$). Note that for the update interval T=t$_{k+1}$−t, the time t denotes the time when the filter was last updated, whereas t$_{k+1}$ is the time of the new measurement, which can be from a time prior to t due to propagation delay and, therefore, T<0. If there is no delay, then usually t=t$_k$, the time of the previous measurement and in such a case T≧0.

From block 214 of FIG. 2, the logic of FIG. 2 flows to a block 216, which represents the measurement z(k+1) of aspects of the state of the system.

The latency of the measurement is determined in decision block 218 by testing the sign of the update interval, i.e., T<0.

If T<0, the logic of the invention then flows from decision block 218 of FIG. 2 by way of the YES output and a path 219 to a block 220, in which the matrices F and G are calculated according to $$F = \Phi + \Gamma \frac{\partial u}{\partial x}\bigg|_{x=\hat{x}(t|k),\lambda=\bar{\lambda}} \quad (39)$$

$$G = \Gamma \frac{\partial u}{\partial \lambda}\bigg|_{x=\hat{x}(t|k),\lambda=\bar{\lambda}} \quad (40)$$

From block 220, the logic of FIG. 2 flows to a block 222, which accesses or inputs a parameter matrix Λ. The parameter matrix Λ represents the physical bounds on the unknown parameters, such as turn, rate and tangential acceleration, and is preferably selected based on a precise description of the physical system, and depends upon well-known physical phenomena and characteristics of real systems. Types of physical parameters, which might be considered for determination of Λ in the case of maneuvers, are the turn rate ω and the tangential acceleration α. This is a departure from the prior art, which uses a white process noise covariance W that does not correctly model the class of systems addressed by the invention herein.

From block 222 of FIG. 2, the logic flow of the invention proceeds to a block 224, which represents the extrapolation of state estimates $\hat{x}$(t|k) and matrices M(t|k), D(t|k), E(t|k) to yield $\hat{x}$(k+1|k), M(k+1|k), D(k+1|k) and E(k+1|k) according to $$\hat{x}(k+1|k)=\Phi\hat{x}(t|k)+\Gamma u(\hat{x}(t|k),\bar{\lambda}) \quad (41)$$

$$M(k+1|k)=FM(t|k)F' \quad (42)$$

$$D(k+1|k)=FD(t|k)+G \quad (43)$$

$$E(k+1|k)=FE(t|k) \quad (44)$$

From block 224 of FIG. 2, the logic flows to a block 226, which represents the accessing or inputting of the measurement bias covariance B and measurement noise covariance N.

Block 228 of FIG. 2 computes filter matrix, P(k+1|k), intermediate matrix V, and covariance of the residual Q according to $$P(k+1|k)=M(k+1|k)+D(k+1|k)\Lambda D(k+1|k) \quad (45)$$

$$V=HE(k+1|k)+J \quad (46)$$

$$Q=HP(k+1|k)H'+VBV'+N \quad (47)$$

respectively. Thus, there are several differences between the invention herein as exemplified in FIG. 2 and the prior art. First, $\bar{\lambda}$ in the input function u($\hat{x}$(t|k),$\bar{\lambda}$) in formula (41) refers to the mean value of the parameters λ, whose bounds are represented by the matrix Λ in formula (45). Note that the input function u(x(k),λ) may be a nonlinear function of the state variables x(k) and the multidimensional parameters λ. Another difference is that the prior art Kalman filter extrapolates the state covariance, while the current invention extrapolates the matrices M(t|k), D(t|k), E(t|k) to M(k+1|k), D(k+1|k), E(k+1|k) respectively, as in formulas (42) and (43), and then forms the matrix P(k+1|k) from M(k+1|k), D(k+1|k), and Λ as in formula (45).

Block 230 of FIG. 2 computes filter matrix A, filter gain matrix K, and filter matrix L. The filter matrix A is calculated as $$A=M(t|k)F'H'+D(t|k)\Lambda D(k+1|k)'H'+E(t|k)BV' \quad (48)$$

The filter gain matrix K is calculated as $$K=AQ^{-1} \quad (49)$$

and the matrix L is calculated as $$L=I-KHF \quad (50)$$

where I is the identity matrix.

The logic flows from block 230 of FIG. 2 to a block 232, which represents the updating of the state estimate and the associated matrices. More particularly, the state estimate $\hat{x}$(t|k+1) is calculated as $$\hat{x}(t|k+1)=\hat{x}(t|k)+K[z(k+1)-H\hat{x}(k+1|k)] \quad (51)$$

The matrices M(t|k+1), D(t|k+1), E(t|k+1) are calculated as $$M(t|k+1)=LM(t|k)L'+KNK' \quad (52)$$

$$D(t|k+1)=D(t|k)-KHD(k+1|k) \quad (53)$$

$$E(t|k+1)=E(t|k)-KV \quad (54)$$

respectively. Finally, the matrix of the total covariance S(t|k+1) is calculated as $$S(t|k+1)=M(t|k+1)+D(t|k+1)\Lambda D(t|k+1)'+E(t|k+1)BE(t|k+1)' \quad (55)$$

and equation (55) represents a mean-square criterion which may be used for a root-mean-square determination. The logic of FIG. 2 returns from block 232 to block 212 by way of a path 233.

Figure 3:
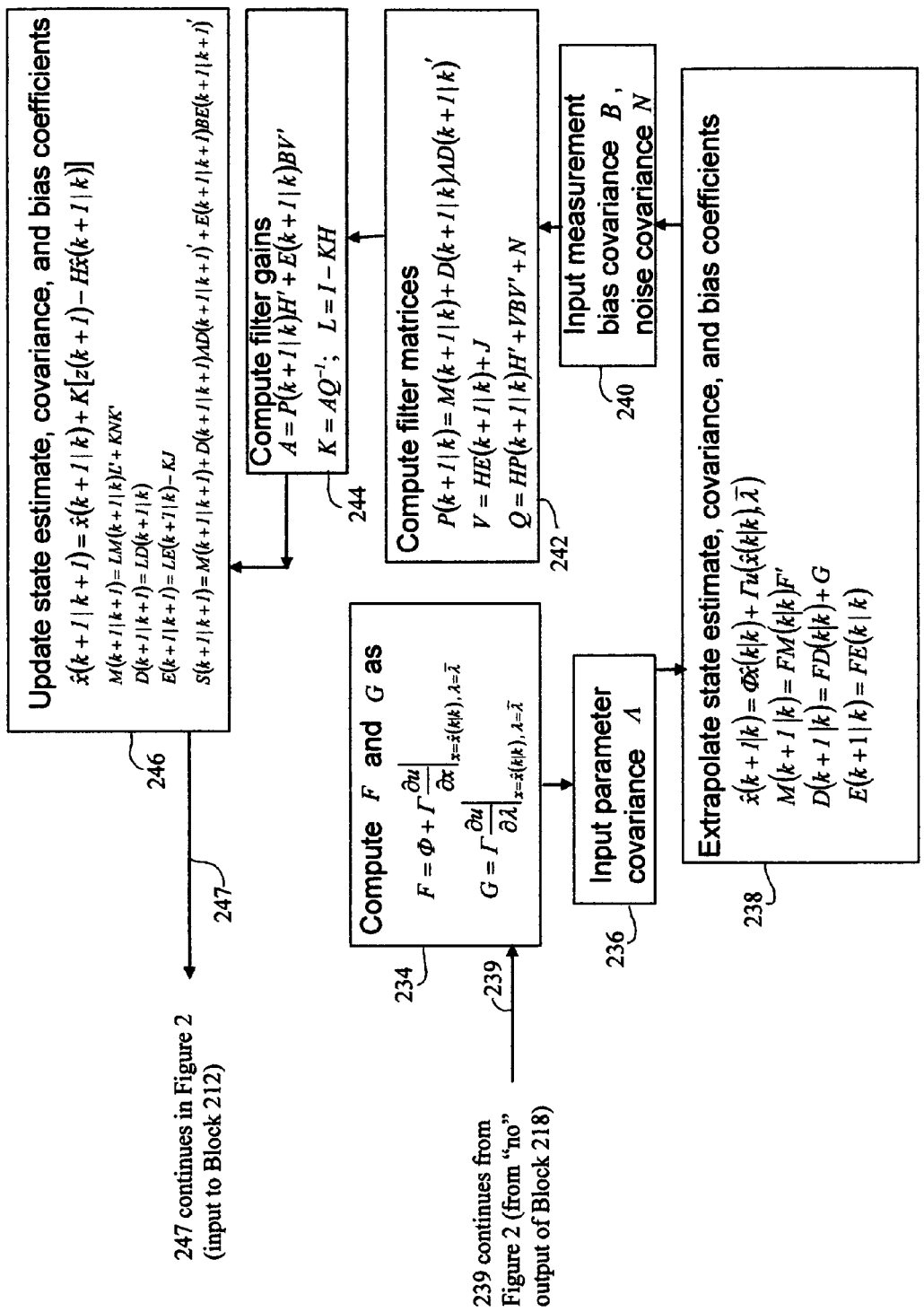

Returning now to decision block 218 of FIG. 2, the logic may leave block 218 by the NO output if T≧0, and in that case the logic flows by way of a path 239 to block 234 of FIG. 3. Block 234 of FIG. 3 represents calculation of the matrices F and G according to $$F = \Phi + \Gamma \frac{\partial u}{\partial x}\bigg|_{x=\hat{x}(k|k), \lambda=\overline{\lambda}} \tag{56}$$

$$G = \Gamma \frac{\partial u}{\partial \lambda}\bigg|_{x=\hat{x}(k|k), \lambda=\overline{\lambda}} \tag{57}$$

These equations are different from those used in block 220 of FIG. 2 upon the substitution indicated above.

From block 234 of FIG. 3, the logic of the invention of FIG. 3 flows to a block 236, equivalent to block 222, which accesses or inputs a parameter matrix $\Lambda$. The parameter matrix $\Lambda$ represents the physical bounds on the unknown parameters, such as turn rate and tangential acceleration, and is preferably selected based on a description of the physical system, which should be as precise as possible or practicable. The parameter matrix $\Lambda$ depends upon well-known physical phenomena and characteristics of real systems. Types of physical parameters, which might be considered for determination of $\Lambda$ in the case of maneuvers, are the turn rate $\omega$ and the tangential acceleration $\alpha$. As noted, this is a departure from the prior art, which uses a white process noise covariance W that does not correctly model the class of systems addressed by the invention herein.

From block 236 of FIG. 3, the logic flow proceeds to a block 238, which represents the extrapolation of state estimates $\hat{x}(k|k)$, and matrices $M(k|k)$, $D(k|k)$, and $E(k|k)$ according to $$\hat{x}(k+1|k)=\Phi\hat{x}(k|k)+\Gamma u(\hat{x}(k|k),\overline{\lambda}) \tag{58}$$

$$M(k+1|k)=FM(k|k)F' \tag{59}$$

$$D(k+1|k)=FD(k|k)+G \tag{60}$$

$$E(k+1|k)=FE(k|k) \tag{61}$$

respectively. Thus, another difference between the invention herein and the prior art is that the prior art Kalman filter extrapolates the state estimate and its covariance, while the current invention extrapolates the state estimate $\hat{x}(k|k)$ and matrices $M(k|k)$, $D(k|k)$, $E(k|k)$ to $\hat{x}(k+1|k)$ and $M(k+1|k)$, $D(k+1|k)$, $E(k+1|k)$ respectively.

From block 238 of FIG. 3, the logic flows to a block 240, which represents the accessing or inputting of the measurement bias covariance B and measurement noise covariance N.

Block 242 of FIG. 3 computes filter matrix $P(k+1|k)$, intermediate matrix V, and residual Q according to $$P(k+1|k)=M(k+1|k)+D(k+1|k)\Lambda D(k+1|k)' \tag{62}$$

$$V=HE(k+1|k)+J \tag{63}$$

$$Q=HP(k+1|k)H'+VBV'+N \tag{64}$$

respectively.

Block 244 of FIG. 3 computes filter matrix A, filter gain matrix K, and filter matrix L. While generically similar to the prior art, the filter gain matrix K obtained in block 244 of the arrangement of FIG. 3 is or are different from the filter gain matrix K obtained in the prior art because of the use of $M(k+1|k)$, $D(k+1|k)$, $E(k+1|k)$ and $\Lambda$, B to formula Q in equation (64). The filter gain matrix K is calculated as $$A=P(k+1|k)H'+E(k+1|k)BV' \tag{65}$$

$$K=AQ^{-1} \tag{66}$$

and the matrix L is calculated as $$L=I-KH \tag{67}$$

where I is the identity matrix.

The logic flows from block 244 of FIG. 3 to a block 246, which represents the updating of the state estimate and the associated matrices. More particularly, the state estimate $\hat{x}(k+1|k+1)$ is calculated as $$\hat{x}(k+1|k+1)=\hat{x}(k+1|k)+K[z(k+1)-H\hat{x}(k+1|k)] \tag{68}$$

Also in block 246, the matrices $M(k+1|k+1)$, $D(k+1|k+1)$, $E(k+1|k+1)$ are calculated as $$M(k+1|k+1)=LM(k+1|k)L'+KNK' \tag{69}$$

$$D(k+1|k+1)=LD(k+1|k) \tag{70}$$

$$E(k+1|k+1)=LE(k+1|k)-KJ \tag{71}$$

respectively. Finally, the matrix of the total covariance $S(k+1|k+1)$ is calculated as $$S(k+1|k+1)=M(k+1|k+1)+D(k+1|k+1)\Lambda D(k+1|k+1)'+E(k+1|k+1)BE(k+1|k+1) \tag{72}$$

The logic leaves block 246 of FIG. 2 and returns to block 212 of FIG. 2 by way of a logic path 247. The above equations (38)–(72) are set forth in FIGS. 2 and 3.

The calculations associated with blocks 238 and 246 of FIG. 3 separate the state estimation error covariance $S(j|k)$ into components, $M(j|k)$, $D(j|k)\Lambda D(j|k)'$, $E(j|k)BE(j|k)'$ attributable to random measurement error, parameter uncertainty, and measurement biases, and separately propagates these covariances from one time index k to next time index k+1. In addition, the gain matrix K is computed based on these propagated covariances. The gains weight the measurements to form the state estimates. The values of these gains so computed are different from those computed by the prior art method.

A salient difference between the prior-art method and that of the invention is the introduction into the operative equations of the matrices $M(j|k)$, $D(j|k)$, and $E(j|k)$. The matrix $M(j|k)$ is defined as the covariance of the state estimation errors at time $t_j$ due only to the errors in the measurements $z(i)$ for $1 \leq i \leq k$ and a priori initial information that is independent of the parameter uncertainty and measurement bias uncertainty. $D(j|k)$ is defined as the matrix of bias coefficients, which linearly relates state estimation errors to the parameter errors, at time $t_j$ for $j=0, 1, 2, \ldots$ after processing k measurements $z(i)$ for $1 \leq i \leq k$. $E(j|k)$ is defined as the matrix of bias coefficients, which linearly relates state estimation errors to the sensor measurement bias, at time $t_j$ for $j=0, 1, 2, \ldots$ after processing k measurements $z(i)$ for $1 \leq i \leq k$.

The invention uses a novel mean-square optimization criterion (equation (55)) which explicitly addresses the known physical bounds of the multidimensional system parameters and sensor biases, and incorporates analytical modeling of their bounds. The invention provides a computationally efficient recursive algorithm for optimally estimating the state of a system, using the criterion of minimizing the mean-square total error.

What is claimed is:

1. A method for recursively estimating the state of a system having multidimensional parameters $\lambda$ in addition to state variables $x(k)$ at time $t_k$ for $k=0, 1, 2, \ldots$, which parameters $\lambda$ are unknown, arbitrarily time-varying, but bounded, and driven by the input function $u(x(k), \lambda)$, which may be nonlinear, and expressed by the state equation $$x(k+1)=\Phi x(k)+\Gamma u(x(k),\lambda) \tag{73}$$

where $\Phi$, $\Gamma$ are system matrices dependent on the discrete time interval $T=t_{k+1}-t_k$, said method comprising the following steps:

measuring aspects of the state of the system to produce initial measurements expressed by the measurement equation $$z(k)=Hx(k)+Jb+n(k) \tag{74}$$

for $1 \leq k \leq k_0$, where, if no measurements are used in the initialization of the filter, $k_0=0$, where b is an unknown arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$;

initializing state estimates $\hat{x}(k_0|k_0)$ and the matrices $M(k_0|k_0)$, $D(k_0|k_0)$, $E(k_0|k_0)$ using a priori information and the initial measurements ($D(k_0|k_0)=0$ if the initial state estimates do not depend on the parameters $\lambda$; $E(k_0|k_0)=0$ if there are no initial measurements), where vector $\hat{x}(t|k)$ is defined as the estimate of the state of the system at time t after processing k measurements $z(i)$ for $1 \leq i \leq k$;

vector $\hat{x}(t_j|k)$ is denoted as $\hat{x}(j|k)$ when the time $t=t_j$ is the time of the $j^{th}$ measurement for $j=1, 2, 3, \ldots$;

matrix $M(t|k)$ is defined as the covariance of the state estimation errors at time t due only to the random errors in the k measurements $z(i)$ for $1 \leq i \leq k$ and a priori initial information that is independent of the parameter uncertainty and measurement bias uncertainty;

matrix $M(t_j|k)$ is denoted as $M(j|k)$, when the time $t=t_j$ is the time of the $j^{th}$ measurement for $j=1, 2, 3, \ldots$;

matrix $D(t|k)$ is defined as the matrix of bias coefficients, which linearly relates state estimation errors to the parameter errors, at time t after processing k measurements $z(i)$ for $1 \leq i \leq k$;

matrix $D(t_j|k)$ is denoted as $D(j|k)$, when the time $t=t_j$ is the time of the $j^{th}$ measurement for $j=1, 2, 3, \ldots$;

matrix $E(t|k)$ is defined as the matrix of bias coefficients, which linearly relates state estimation errors to the sensor measurement bias, at time t after processing k measurements $z(i)$ for $1 \leq i \leq k$;

matrix $E(t_j|k)$ is denoted as $E(j|k)$, when the time $t=t_j$ is the time of the $j^{th}$ measurement for $j=1, 2, 3, \ldots$;

determining the time $t_{k+1}$ of a new measurement and the time t when the filter was last updated;

determining the system transition matrices $\Phi$ and $\Gamma$ using the update interval $T=t_{k+1}-t$;

determining the mean value $\bar{\lambda}$ of unknown but bounded parameters $\lambda$, and the input vector $u(\hat{x}(t|k),\bar{\lambda})$;

measuring aspects of the state of the system expressed by the measurement equation $$z(k)=Hx(k)+Jb+n(k) \tag{75}$$

where b is an unknown arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$ for $k=1, 2, 3, \ldots$;

determining if the measurement is time-late by testing $T<0$;

(a) if the measurement is time-late determining F,G as follows $$F = \Phi + \Gamma \frac{\partial u}{\partial x}\bigg|_{x=\hat{x}(t|k), \lambda=\bar{\lambda}} \tag{76}$$

$$G = \Gamma \frac{\partial u}{\partial \lambda}\bigg|_{x=\hat{x}(t|k), \lambda=\bar{\lambda}} \tag{77}$$

generating a parameter matrix $\Lambda$, representing physical bounds on the parameters $\lambda$ that are not state variables of the system;

extrapolating said state estimates $\hat{x}(t|k)$ and matrices $M(t|k)$, $D(t|k)$, $E(t|k)$ to $\hat{x}(k+1|k)$, $M(k+1|k)$, $D(k+1|k)$, $E(k+1|k)$ as in $$\hat{x}(k+1|k)=\Phi \hat{x}(t|k)+\Gamma u(\hat{x}(t|k),\bar{\lambda}) \tag{78}$$

$$M(k+1|k)=FM(t|k)F' \tag{79}$$

$$D(k+1|k)=FD(t|k)+G \tag{80}$$

$$E(k+1|k)=FE(t|k) \tag{81}$$

and calculating $P(k+1|k)$ as in $$P(k+1|k)=M(k+1|k)+D(k+1|k)\Lambda D(k+1|k)' \tag{82}$$

determining covariance of the residual Q as in $$V=HE(k+1|k)+J \tag{83}$$

$$Q=HP(k+1|k)H'+VBV'+N \tag{84}$$

determining the filter gain matrix K as in $$A=M(t|k)F'H'+D(t|k)\Lambda D(k+1|k)H'+E(t|k)BV' \tag{85}$$

$$K=AQ^{-1} \tag{86}$$

determining the matrix L as in $$L=I-KHF \tag{87}$$

where I is the identity matrix;

updating the state estimate $\hat{x}(t|k)$ as $$\hat{x}(t|k+1)=\hat{x}(t|k)+K[z(k+1)-H\hat{x}(k+1|k)] \tag{88}$$

updating the matrices $M(t|k)$, $D(t|k)$, $E(t|k)$ to yield $M(t|k+1)$, $D(t|k+1)$, and $E(t|k+1)$ as in $$M(t|k+1)=LM(t|k)L'+KNK' \tag{89}$$

$$D(t|k+1)=D(t|k)-KHD(k+1|k) \tag{90}$$

$$E(t|k+1)=E(t|k)-KV \tag{91}$$

respectively, and generating the total mean square error $S(t|k+1)$ as in $$S(t|k+1)=M(t|k+1)+D(t|k+1)\Lambda D(t|k+1)'+E(t|k+1)BE(t|k+1) \tag{92}$$

(b) and if the measurement is not time-late determining F,G using $$F = \Phi + \Gamma \frac{\partial u}{\partial x}\bigg|_{x=\hat{x}(k|k), \lambda=\bar{\lambda}} \quad (93)$$

$$G = \Gamma \frac{\partial u}{\partial \lambda}\bigg|_{x=\hat{x}(k|k), \lambda=\bar{\lambda}} \quad (94)$$

generating a parameter matrix $\Lambda$, representing physical bounds on those parameters that are not state variables of the system;

extrapolating said state estimates $\hat{x}(k|k)$ and matrices $M(k|k)$, $D(k|k)$, and $E(k|k)$, to $\hat{x}(k+1|k)$, $M(k+1|k)$, $D(k+1|k)$, and $E(k+1|k)$ as $$\hat{x}(k+1|k) = \Phi\hat{x}(k|k) + \Gamma u(\hat{x}(k|k), \bar{\lambda}) \quad (95)$$

$$M(k+1|k) = FM(k|k)F' \quad (96)$$

$$D(k+1|k) = FD(k|k) + G \quad (97)$$

$$E(k+1|k) = FE(k|k) \quad (98)$$

determining covariance of the residual Q as $$P(k+1|k) = M(k+1|k) + D(k+1|k)\Lambda D(k+1|k)' \quad (99)$$

$$V = HE(k+1|k) + J \quad (100)$$

$$Q = HP(k+1|k)H' + VBV' + N \quad (101)$$

determining the filter gain matrix K as $$A = P(k+1|k)H' + E(k+1|k)BV' \quad (102)$$

$$K = AQ^{-1} \quad (103)$$

determining the matrix L as $$L = I - KH \quad (104)$$

where I is the identity matrix;
updating the state estimate $\hat{x}(k+1|k)$ as $$\hat{x}(k+1|k+1) = \hat{x}(k+1|k) + K[z(k+1) - H\hat{x}(k+1|k)] \quad (105)$$

updating the matrices $M(k+1|k)$, $D(k+1|k)$, $E(k+1|k)$ as $$M(k+1|k+1) = LM(k+1|k)L' + KNK' \quad (106)$$

$$D(k+1|k+1) = LD(k+1|k) \quad (107)$$

$$E(k+1|k+1) = LE(k+1|k) - KJ \quad (108)$$

respectively, and generating the total mean square error $S(k+1|k+1)$ as $$S(k+1|k+1) = M(k+1|k+1) + D(k+1|k+1)\Lambda D(k+1|k+1)' + E(k+1|k+1)BE(k+1|k+1)' \quad (109)$$

2. A method according to claim 1, wherein said step of measuring aspects of the state of the system includes measuring any aspect of the state using a measuring device, where the measuring device can be, but is not limited to radar, sonar, optical sensors, rate gyros, accelerometers, thermometers.

3. A method according to claim 1, wherein said step of measuring aspects of the state of the system includes at least one of the steps of measuring position, a range, or an angle of a target.

4. A method for estimating the state of a system, said method comprising the steps of:

observing a system having state variables and also having unknown, multidimensional, arbitrarily time-varying parameters, but which are subject to known bounded values;

measuring certain aspects of the state of the system in the presence of sensor measurement biases and random errors to produce initial measurements;

initializing state estimates and matrices using a priori information and the initial measurements;

using the update interval in determining the system transition matrices and the mean value of unknown but bounded parameters and the input vector;

determining if the measurement is time-late by testing the sign of the update interval;

if the measurement is time-late applying the measurements to an out-of-sequence estimating filter that explicitly uses a mean square optimization criterion that separately accounts for measurement biases and errors and said bounding values, as well as the delay time, to produce estimates of the true state of the system;

if the measurement is not time-late applying the measurements to an in-sequence estimating filter that explicitly uses a mean square optimization criterion that separately accounts for measurement biases and errors and said bounding values, to produce estimates of the true state of the system;

applying said estimates to one of (a) make a decision, (b) operate a control system, and (c) control a process.

5. A method for state estimation by processing time-delayed measurements with unknown biases that may vary arbitrarily in time within known physical bounds, said method comprising the steps of:

obtaining measurements from systems characterized by state variables and by multidimensional parameters, which multidimensional parameters are also unknown and may vary arbitrarily in time within known physical bounds;

if a measurement is time-late, the measurements are applied to an out-of-sequence filter using a mean square optimization criterion that nominally accounts for all sources of uncertainty and delay time, to produce estimates of the true states of the system;

if the measurement is not time-late, the measurements are applied to an in-sequence filter using a mean square optimization criterion that nominally accounts for all sources of uncertainty to produce estimates of the true states of the system.

6. A method according to claim 5, further comprising the step of applying the estimates to one of (a) making a decision, (b) operating a control system, and (c) controlling a process.

* * * * *